Sept. 24, 1963 J. J. SHIELDS 3,104,525
MOUNTING STRUCTURE
Filed Aug. 22, 1958 2 Sheets-Sheet 1
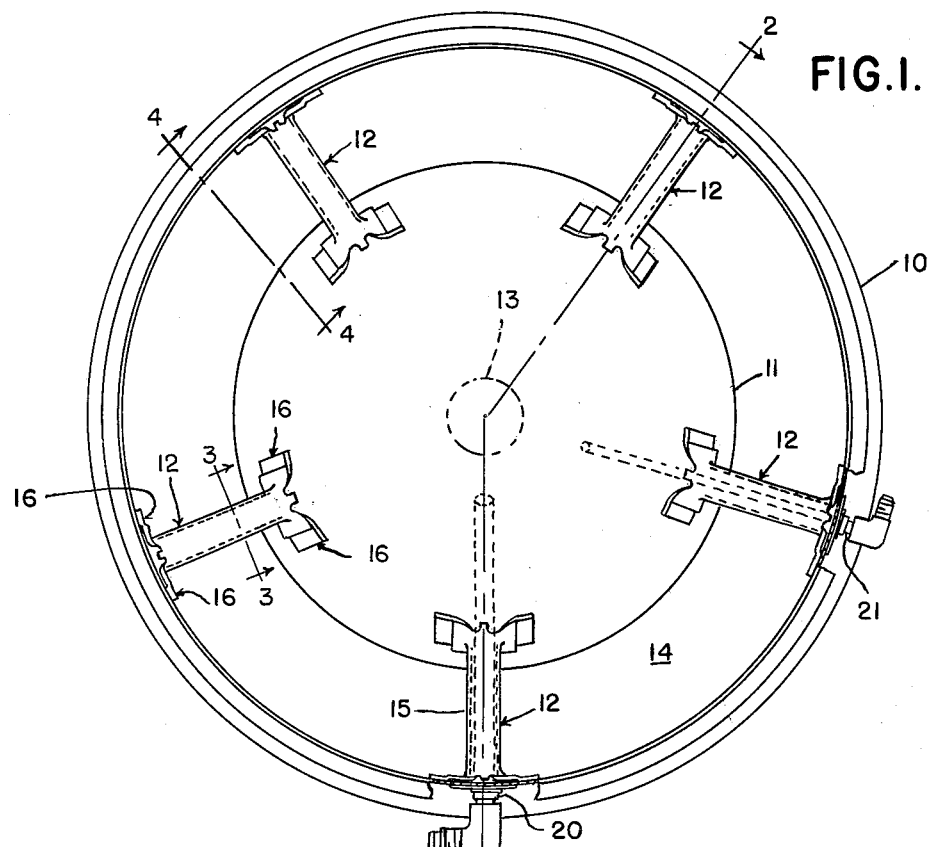
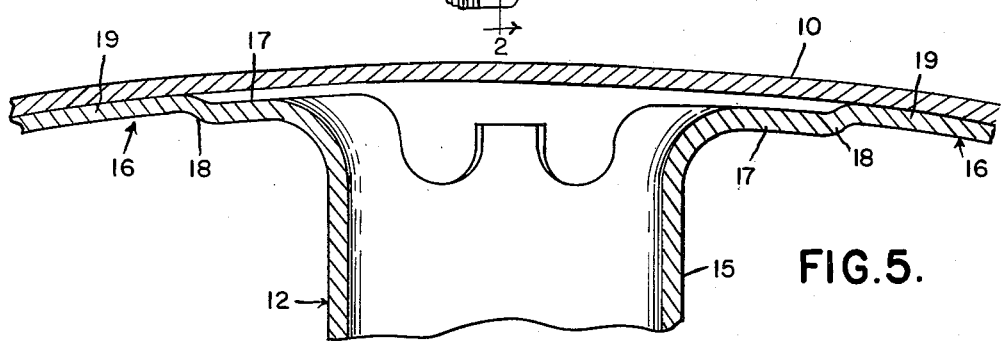
INVENTOR.
JAMES J. SHIELDS
BY
*Hanke & Hardy*
ATTORNEYS

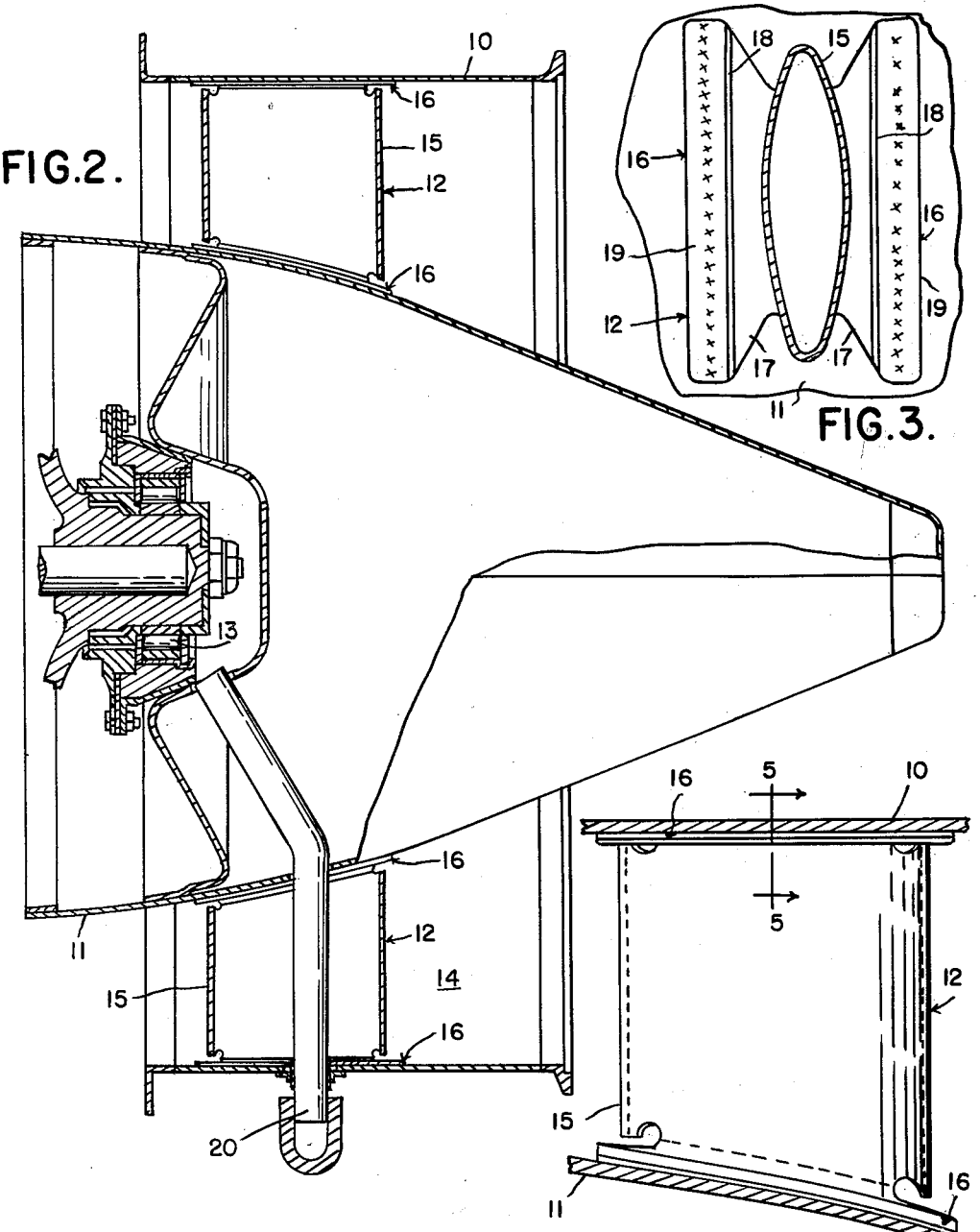

United States Patent Office 3,104,525
Patented Sept. 24, 1963

3,104,525
MOUNTING STRUCTURE
James J. Shields, Grosse Pointe Woods, Mich., assignor to Continental Aviation and Engineering Corporation, Detroit, Mich., a corporation of Virginia
Filed Aug. 22, 1958, Ser. No. 756,583
3 Claims. (Cl. 60—39.32)

My invention relates to gas turbine engine construction and more particularly to a connecting structure for positioning and supporting aerodynamic or structural forms in the hot gas stream whose inner and outer members and supporting struts are subject to high transient thermal gradients.

In the operation of gas turbine engines, particularly during starting and shut-down, wide temperature variations exist between the structure subjected to exhaust gas flow and other internal structure, such as the tail cone and the rear bearing support housing. The consequent variations in thermal expansion require the provision of a compensating means, otherwise damage to the structure will result. Various mechanical supporting arrangements have been tried, but they are expensive and not thoroughly reliable and are often built to permit angular displacements of structure to compensate for thermal expansion, which is not desirable. Where close radial clearances with rotating turbine components are important, the maintenance of concentricity between inner and outer housings is of paramount importance.

Another object of the present invention is to simplify such structure by providing an expandable support between the outer tailpipe and the inner tail cone structure.

Another object of the invention is to improve mounting structures by providing an expandable support between the outer tailpipe and the inner tail cone structure.

Another object of the invention is to improve mounting structures by providing an expandable support operable to absorb relative differences in thermal expansion while retaining the structural components against angular and translational displacement.

A further object of the invention is to improve turbine engine construction by providing a plurality of simplified expandable struts connected to and spacing the tail pipe and the tail cone rear bearing support structure.

Yet another object of the invention is to improve the construction of struts spacing the tail pipe and tail cone structures of a turbine engine by providing each strut with flexible feet at each end secured to the respective structures.

For a more complete understanding of the invention reference may be had to the accompanying drawings illustrating a preferred embodiment of the invention in which like reference characters refer to like parts throughout the several views and in which FIG. 1 is a cross section through a portion of a turbine engine tailpipe embodying the invention.

FIG. 2 is a longitudinal section of the tailpipe portion as taken on the line 2—2 of FIG. 1.

FIG. 3 is a cross-sectional view of a strut taken on the line 3—3 of FIG. 1.

FIG. 4 is an elevational view of a strut as seen from the line 4—4 of FIG. 1, and FIG. 5 is a fragmentary enlarged cross sectional view taken substantially on the line 5—5 of FIG. 4.

A portion of a gas turbine engine tailpipe or housing structure 10 is illustrated as supporting substantially centrally therein a tail cone housing structure 11 preferably by means of a plurality of struts 12. The tail cone 11 carries the turbine engine rear bearing 13, and the annular space 14 between the housings 10 and 11 provides a passage for the hot exhaust gases from the turbine engine.

This space 14 will vary due to the relative differences of thermal expansion and contraction of the struts 12 and housing structures 10 and 11, particularly in starting of the engine and after cut off when the structures are cooling and the struts 12 are constructed to expand and contract radially to absorb these variations while yet retaining and supporting the tail cone 11 centrally in position and against any angular displacement.

Each strut 12, in accordance with the invention, preferably comprises an elongated intermediate airfoil portion 15, extending radially between the housings 10 and 11, the broad sides of each end of the airfoil portion 15, being provided with feet or flanges 16, which extend laterally from the airfoil portion 15.

Each flange 16 has an intermediate portion 17 of controlled flexibility and deflecting capacity spaced a short distance from the housing structure as illustrated in FIG. 5, and is bent as at 18 to provide an outer flange portion 19 which contacts and is rigidly secured to the housing by any means preferably such as overlapped spot welding along the line X—X shown in FIG. 3.

Under the relative thermal alterations of the housings and struts 12, radial expansion and contraction of the struts 12 is effected by the flexing action of the flange portions 17 toward and away from the housings 10 and 11, thus absorbing the thermal changes while maintaining substantial supporting rigidity of the structures.

The struts 12 are preferably hollow to provide unobstructed passage for elements such as pipes or conduits 20 and 21 as shown in FIGS. 1 and 2.

Although I have described but one preferred embodiment of the invention, it will be apparent to one skilled in the art to which the invention pertains that various changes and modifications may be made therein without departing from the spirit of the invention or the scope of the appended claims.

I claim:

1. In a gas turbine engine having substantially concentric coaxial outer and inner housing structures, a plurality of annularly spaced radially extending struts connecting and radially spacing said housing structures and retaining said housing structures against relative angular and translational displacement, each of said struts comprising an intermediate inflexible section and flexible foot portions integrally fixed at each end of said intermediate section and respectively permanently attached to said inner and outer housing structure, whereby to compensate for relative thermal expansion of said struts and housing structures.

2. In a gas turbine engine as defined in claim 1, wherein said intermediate inflexible section comprises a rigid elongated airfoil section, said airfoil sections being disposed on intersecting annularly spaced planes, and in which said foot portions comprise oppositely extending flexible members permanently attached at their outer extremities to said housing structures at points offset from the plane of said airfoil section.

3. In a gas turbine engine as defined in claim 2, wherein said foot portions each comprise a laterally extending stepped flange having the end part disposed flush against and secured to a housing structure and an intermediate part adjacent said airfoil section laterally extending in substantial parallel relation and radially spaced with respect to the plane of the housing structure, said intermediate part of said flange operable to flex toward and away from said housing structure to absorb relative differences in thermal expansion and contraction of said housing structures and said struts.

References Cited in the file of this patent
UNITED STATES PATENTS

| | | |
|---|---|---|
| 2,509,503 | Huyton | May 30, 1950 |
| 2,648,353 | Haworth | Aug. 11, 1953 |
| 2,795,108 | Saldin | June 11, 1957 |